United States Patent
Rojas et al.

(10) Patent No.: US 10,705,499 B2
(45) Date of Patent: Jul. 7, 2020

(54) SYSTEM AND METHOD FOR AUTOMATED SHUTDOWN AND STARTUP FOR A NETWORK

(71) Applicant: Schlumberger Technology Corporation, Sugar Land, TX (US)

(72) Inventors: Juan Jose Rojas, Sugar Land, TX (US); Wilson Silva dos Santos, Jr., Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 278 days.

(21) Appl. No.: 15/941,588

(22) Filed: Mar. 30, 2018

(65) Prior Publication Data

US 2019/0302723 A1    Oct. 3, 2019

(51) Int. Cl.
| | |
|---|---|
| *G05B 19/05* | (2006.01) |
| *E21B 41/00* | (2006.01) |
| *G06F 9/455* | (2018.01) |
| *E21B 44/00* | (2006.01) |

(52) U.S. Cl.
CPC .......... *G05B 19/05* (2013.01); *E21B 41/0092* (2013.01); *G05B 2219/15012* (2013.01)

(58) Field of Classification Search
CPC .... G05B 19/05; G05B 19/00; G05B 19/0428; G05B 19/4559; G06F 21/31; G06F 2009/455575; H04L 63/10; H04L 63/109; H04L 63/162; E21B 41/0092; E21B 44/00; G06B 2219/15012
See application file for complete search history.

(56) References Cited

U.S. PATENT DOCUMENTS

| | | | |
|---|---|---|---|
| 6,873,267 B1 | 3/2005 | Tubel et al. | |
| 6,920,085 B2 | 7/2005 | Finke et al. | |
| 7,145,472 B2 | 12/2006 | Lilly et al. | |
| 7,200,643 B2 * | 4/2007 | Latvakoski | G05B 19/0423 709/217 |

(Continued)

FOREIGN PATENT DOCUMENTS

| | | |
|---|---|---|
| WO | 2015190934 A1 | 12/2015 |
| WO | 2016102381 A1 | 6/2016 |

(Continued)

*Primary Examiner* — Alina A Boutah
(74) *Attorney, Agent, or Firm* — Rachel E. Greene

(57) ABSTRACT

A method may include determining a termination time for a virtualization services manager and various termination times for various host devices operating in a drilling management network. The virtualization services manager may generate a virtual machine or a software container that implements a virtualization service on a network layer that controls a drilling operation. The method may further include transmitting, by a shutdown manager, a time delayed termination command to the virtualization services manager and various time delayed termination commands to the host devices. The method may further include terminating operations at the virtualization services manager based on the termination time and in response to the shutdown manager terminating operations. The method may further include terminating operations at the host devices based on the termination times and in response to the virtualization services manager terminating operations.

20 Claims, 8 Drawing Sheets

(56) References Cited

U.S. PATENT DOCUMENTS

| | | |
|---|---|---|
| 7,318,488 B2 | 1/2008 | Hutchinson |
| 7,574,325 B2 | 8/2009 | Dykstra |
| 7,762,131 B2 | 7/2010 | Ibrahim et al. |
| 7,869,444 B2 | 1/2011 | Menard et al. |
| 7,878,250 B2 | 2/2011 | Sheldon |
| 7,970,830 B2 | 6/2011 | Staggs et al. |
| 8,154,419 B2 | 4/2012 | Daussin et al. |
| 8,164,980 B2 | 4/2012 | Sullivan et al. |
| 8,204,692 B2 | 6/2012 | Arango et al. |
| 8,260,736 B1 | 9/2012 | Lear et al. |
| 8,285,277 B2 | 10/2012 | Parker |
| 8,301,386 B1 | 10/2012 | Redmond et al. |
| 8,358,220 B2 | 1/2013 | Savage |
| 8,423,397 B2 | 4/2013 | Sitton |
| 8,615,082 B1 | 12/2013 | Selman et al. |
| 8,616,274 B2 | 12/2013 | Belcher et al. |
| 8,639,021 B2 | 1/2014 | Kim et al. |
| 8,706,899 B2 | 4/2014 | Sunanda |
| 8,761,912 B1 | 6/2014 | Chapman, Jr. et al. |
| 8,838,695 B2 | 9/2014 | Foreman et al. |
| 8,935,100 B2 | 1/2015 | Weiner et al. |
| 9,013,322 B2 | 4/2015 | Roberson et al. |
| 9,024,778 B2 | 5/2015 | Winkler et al. |
| 9,026,270 B2 | 5/2015 | Poettker et al. |
| 9,035,789 B2 | 5/2015 | Loi et al. |
| 9,043,235 B1 | 5/2015 | Sacks et al. |
| 9,074,468 B1 | 7/2015 | Selman et al. |
| 9,107,137 B1 | 8/2015 | Zawodniok et al. |
| 9,175,557 B2 | 11/2015 | Iversen et al. |
| 9,194,228 B2 | 11/2015 | Hall |
| 9,219,760 B2 | 12/2015 | Flanders et al. |
| 9,255,473 B2 | 2/2016 | Burress et al. |
| 9,268,773 B2 | 2/2016 | Arango et al. |
| 9,322,247 B2 | 4/2016 | Rojas et al. |
| 9,359,882 B2 | 6/2016 | Snyder |
| 9,360,852 B2 | 6/2016 | Masten et al. |
| 9,380,261 B2 | 6/2016 | Sherburne |
| 9,391,839 B2 | 7/2016 | Phillips |
| 9,408,039 B2 | 8/2016 | Ralston et al. |
| 9,429,009 B2 | 8/2016 | Paulk et al. |
| 9,429,678 B2 | 8/2016 | Abitrabi et al. |
| 9,441,428 B1 | 9/2016 | Barnes et al. |
| 9,441,430 B2 | 9/2016 | Selman et al. |
| 9,466,197 B2 | 10/2016 | Hildick-Pytte |
| 9,518,459 B1 | 12/2016 | Bermudez Martinez et al. |
| 9,546,545 B2 | 1/2017 | Cardellini et al. |
| 9,575,808 B1 * | 2/2017 | Yamala ............... G06F 9/45558 |
| 9,709,978 B2 * | 7/2017 | Asenjo ............... G05B 19/4185 |
| 9,845,664 B2 | 12/2017 | Nield |
| 2004/0153245 A1 * | 8/2004 | Womer ................... E21B 44/00 702/9 |
| 2011/0155461 A1 * | 6/2011 | Hutniak ................ E21B 44/00 175/24 |
| 2012/0173218 A1 * | 7/2012 | Shafer ................... E21B 41/00 703/7 |
| 2013/0076525 A1 * | 3/2013 | Vu ......................... E21B 41/00 340/853.1 |
| 2013/0106615 A1 | 5/2013 | Prammer |
| 2014/0326449 A1 | 11/2014 | Samuel et al. |
| 2014/0343754 A1 * | 11/2014 | Poettker ............... G05D 1/0016 701/2 |
| 2015/0193251 A1 * | 7/2015 | Chu ....................... G06F 9/485 718/1 |
| 2016/0084076 A1 | 3/2016 | Fanini et al. |
| 2016/0186531 A1 * | 6/2016 | Harkless ................ E21B 44/00 702/6 |
| 2016/0258281 A1 | 9/2016 | Mandal |
| 2017/0159372 A1 | 6/2017 | Zheng et al. |
| 2017/0206103 A1 * | 7/2017 | Arndt ................. G06F 9/45533 |
| 2017/0314369 A1 * | 11/2017 | Rosano ................... F16P 3/142 |
| 2018/0013651 A1 * | 1/2018 | Lang .................. H04L 43/0876 |
| 2018/0058193 A1 | 3/2018 | Hall |
| 2018/0080310 A1 | 3/2018 | Sorenson et al. |
| 2018/0274352 A1 * | 9/2018 | Orban ..................... E21B 44/04 |
| 2018/0351952 A1 * | 12/2018 | Rojas ................... H04L 63/083 |
| 2019/0234208 A1 * | 8/2019 | Orban ...................... E21B 4/02 |
| 2019/0356696 A1 * | 11/2019 | Rojas ..................... G06F 21/57 |

FOREIGN PATENT DOCUMENTS

| | | |
|---|---|---|
| WO | 2017011585 A1 | 1/2017 |
| WO | 2017012981 A1 | 1/2017 |

* cited by examiner

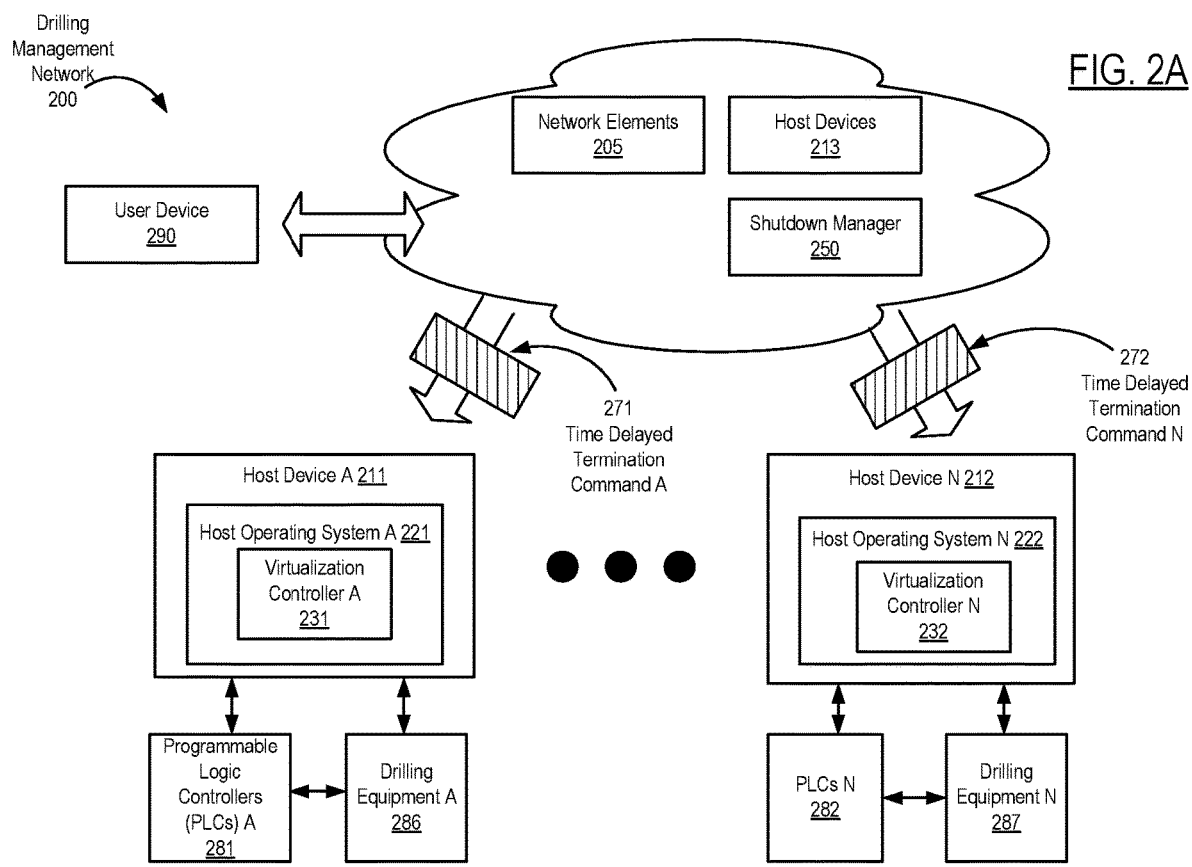

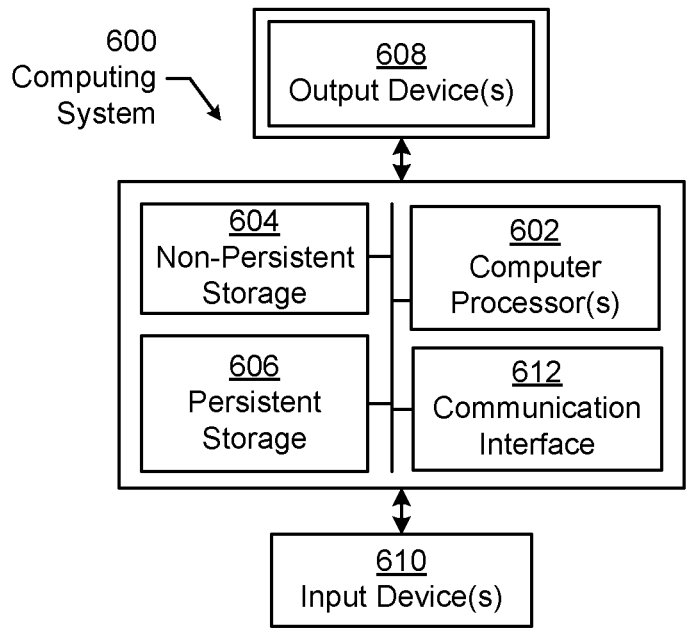
*FIG. 6.1*
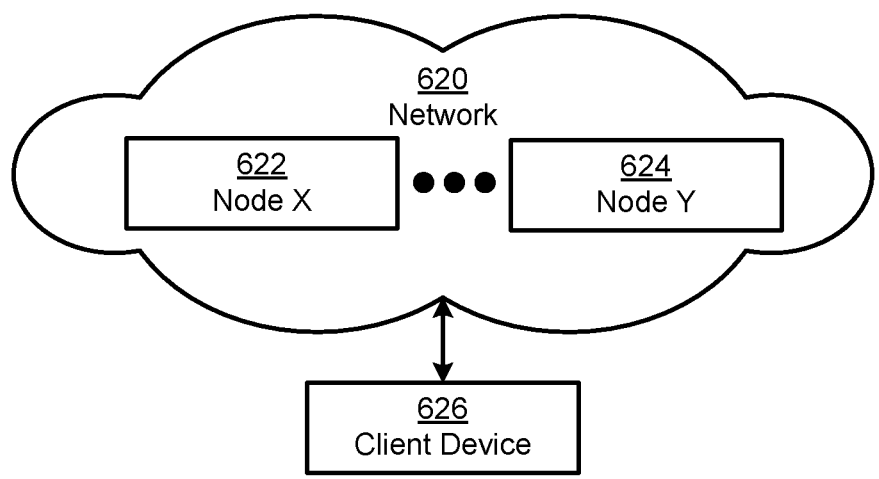
*FIG. 6.2*

SYSTEM AND METHOD FOR AUTOMATED SHUTDOWN AND STARTUP FOR A NETWORK

BACKGROUND

Various network devices may be disposed throughout a drilling rig in order to control various operations on the drilling rig. These network devices may control drilling equipment, monitor the performance of the drilling rig, and/or perform various maintenance operations with respect to the drilling rig.

In a well construction system at a drilling rig, various computer systems may be dedicated systems which work as appliances. In an appliance, power off and power on may correspond to what is called a hard shutdown. In a hard shutdown, a system is merely powered off without consideration of the software running on the system at the shutdown time. Many systems are operated accordingly. However, for many virtualized systems, there is a risk of data corruption if a system's operations are terminated prematurely. Thus, a systematic order may be desired for terminating and booting various network devices in a well construction system. Otherwise, any data associated with the software programs among the virtualized systems may become corrupted or the software program may be unable to perform functions associated with a proper network shutdown.

SUMMARY

In general, in one aspect, the disclosed technology relates to a network. The network includes various network elements. The network further includes various host devices coupled to the network elements. The user network includes various network elements. The network further includes a virtualization services manager coupled to the network elements and that operate on the host devices. The virtualization services manager generates a virtual machine or software container that implements a virtualization service on a network layer. The virtualization service controls a drilling operation. The network further includes a shutdown manager coupled to the network elements, the host devices, and the virtualization services manager. The shutdown manager transmits various time delayed termination commands to the host devices and virtualization services manager. After the shutdown manager terminates operation, the virtualization services manager and the host device terminate operations according to the time delayed termination commands.

In general, in one aspect, the disclosed technology relates to a method. The method includes determining a termination time for a virtualization services manager and various termination times for various host devices operating in a drilling management network. The virtualization services manager generates a virtual machine or a software container that implements a virtualization service on a network layer that controls a drilling operation. The method further includes transmitting, by a shutdown manager, a time delayed termination command to the virtualization services manager and various time delayed termination commands to the host devices. The time delayed termination command corresponds to the termination time and the time delayed termination commands correspond to the termination times. The method further includes terminating operations at the virtualization services manager based on the termination time and in response to the shutdown manager terminating operations. The method further includes terminating operations at the host devices based on the termination times and in response to the virtualization services manager terminating operations.

In general, in one aspect, the disclosed technology relates to a method. The method includes initiating operations at various virtualization controllers operating on various host devices automatically in response to the host devices initiating operations on a drilling management network. The method further includes determining, by a virtualization services manager, various service initiation times for the virtualization controllers. The service initiation times correspond to various predetermined times after initiation of virtualization services on the drilling management network by the virtualization services manager. The method further includes transmitting, by the virtualization services manager, various time delayed initiation commands to the virtualization controllers. The time delayed initiation commands correspond to the service initiation times. The method further includes generating a virtual machine or a software container that control a drilling operation performed by the host devices.

Other aspects of the disclosure will be apparent from the following description and the appended claims.

BRIEF DESCRIPTION OF DRAWINGS

FIGS. 1, 2A, 2B, and 2C show systems in accordance with one or more embodiments.

FIGS. 6.1 and 6.2 show a computing system in accordance with one or more embodiments.

DETAILED DESCRIPTION

Figure 1:
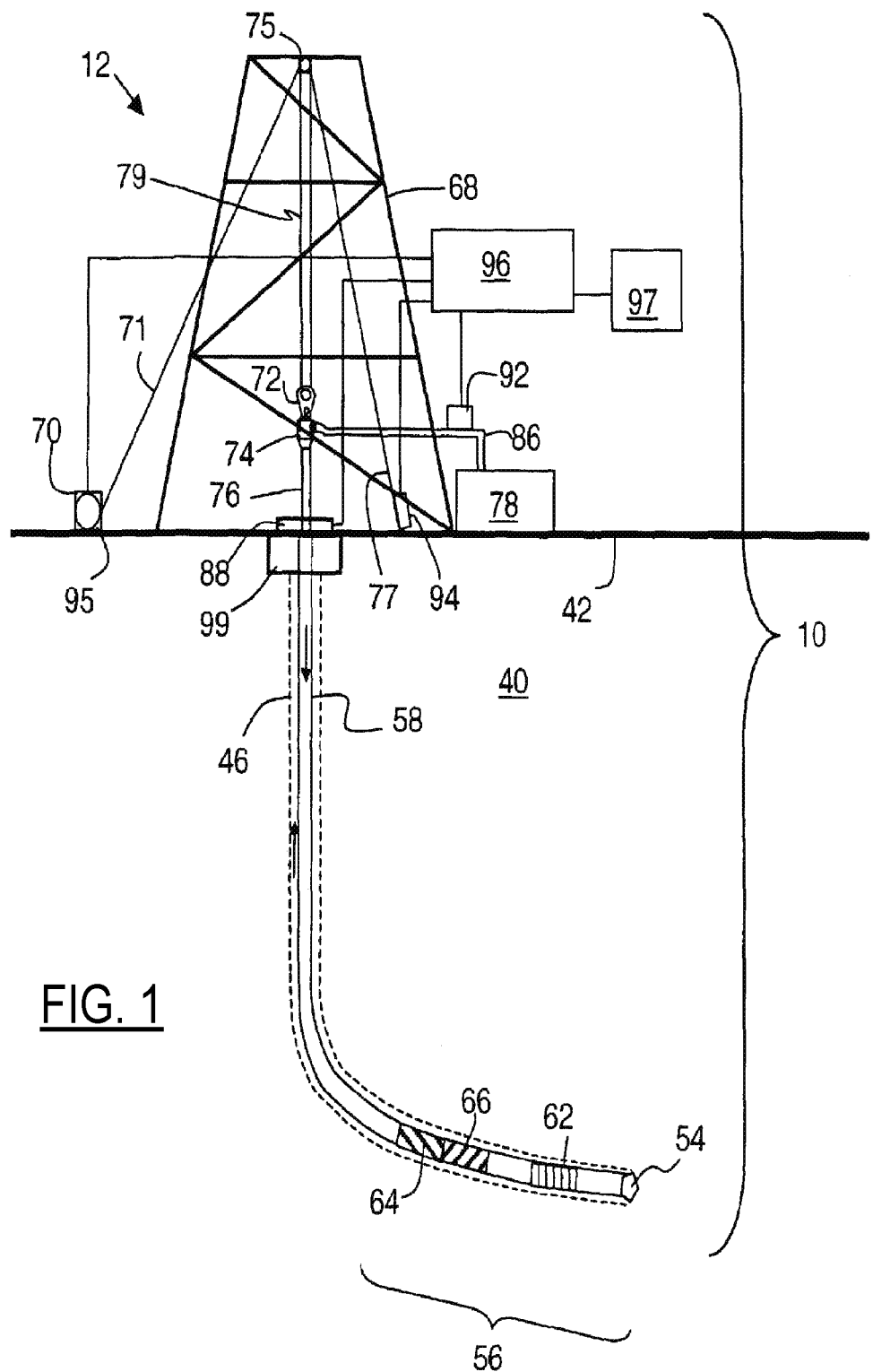

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and various methods for initiating shutdowns and startup operations on a drilling management network. In particular, one or more embodiments are directed to a system that includes a shutdown manager that orchestrates a shutdown sequence of the drilling management network. In some embodiments, for example, virtual machines and software container are terminated before a virtualization services manager's operations terminate. The virtualization services manager may manage and provide virtualization services through the drilling management network, such as the generation and/or termination of various virtual machines and software containers operating on a virtualization services layer. Once the virtualization services manager is terminated, various virtualization controllers may be subsequently terminated on host devices operating throughout the drilling management network. Finally, the host devices may be shutdown.

Accordingly, in some embodiments, the shutdown sequence is an automated process orchestrated by a shutdown manager. In particular, the shutdown manager may coordinate the shutdown sequence using various time delayed termination commands that communicate the time when network devices terminate operations. Thus, by using the time delayed termination commands, the shutdown manager may regulate a graceful shutdown of the network while the shutdown manager is both online on the network as well while the shutdown manager is offline, i.e., after the shutdown manager has already terminated its own operations.

Moreover, embodiments of the disclosure also include a system and various methods for initiating an automated startup process for a drilling management network. For example, various virtualization controllers may elect a virtualization services manager from their group. Accordingly, the virtualization services manager may regulate the automated startup process of various virtualization services, virtual machines, and/or software containers through the drilling management network using time delayed initiation commands.

FIG. 1 shows a block diagram of a system in accordance with one or more embodiments. FIG. 1 shows a drilling system (10) according to one or more embodiments. Drill string (58) is shown within borehole (46). Borehole (46) may be located in the earth (40) having a surface (42). Borehole (46) is shown being cut by the action of drill bit (54). Drill bit (54) may be disposed at the far end of the bottom hole assembly (56) that is attached to and forms the lower portion of drill string (58). Bottom hole assembly (56) may include a number of devices including various subassemblies. Measurement-while-drilling (MWD) subassemblies may be included in subassemblies (62). Examples of MWD measurements may include direction, inclination, survey data, downhole pressure (inside the drill pipe, and/or outside and/or annular pressure), resistivity, density, and porosity. Subassemblies (62) may also include a subassembly for measuring torque and weight on the drill bit (54). The signals from the subassemblies (62) may be processed in a processor (66). After processing, the information from processor (66) may be communicated to pulser assembly (64). Pulser assembly (64) may convert the information from the processor (66) into pressure pulses in the drilling fluid. The pressure pulses may be generated in a particular pattern which represents the data from the subassemblies (62). The pressure pulses may travel upwards though the drilling fluid in the central opening in the drill string and towards the surface system. The subassemblies in the bottom hole assembly (56) may further include a turbine or motor for providing power for rotating and steering drill bit (54).

The drilling rig (12) may include a derrick (68) and hoisting system, a rotating system, and/or a mud circulation system, for example. The hoisting system may suspend the drill string (58) and may include draw works (70), fast line (71), crown block (75), drilling line (79), traveling block and hook (72), swivel (74), and/or deadline (77). The rotating system may include a kelly (76), a rotary table (88), and/or engines (not shown). The rotating system may impart a rotational force on the drill string (58). Likewise, the embodiments shown in FIG. 1 may be applicable to top drive drilling arrangements as well. Although the drilling system (10) is shown being on land, those of skill in the art will recognize that the described embodiments are equally applicable to marine environments as well.

The mud circulation system may pump drilling fluid down an opening in the drill string. The drilling fluid may be called mud, which may be a mixture of water and/or diesel fuel, special clays, and/or other chemicals. The mud may be stored in mud pit (78). The mud may be drawn into mud pumps (not shown), which may pump the mud though stand pipe (86) and into the kelly (76) through swivel (74), which may include a rotating seal. Likewise, the described technologies may also be applicable to underbalanced drilling If underbalanced drilling is used, at some point prior to entering the drill string, gas may be introduced into the mud using an injection system (not shown).

The mud may pass through drill string (58) and through drill bit (54). As the teeth of the drill bit (54) grind and gouge the earth formation into cuttings, the mud may be ejected out of openings or nozzles in the drill bit (54). These jets of mud may lift the cuttings off the bottom of the hole and away from the drill bit (54), and up towards the surface in the annular space between drill string (58) and the wall of borehole (46).

At the surface, the mud and cuttings may leave the well through a side outlet in blowout preventer (99) and through mud return line (not shown). Blowout preventer (99) comprises a pressure control device and a rotary seal. The mud return line may feed the mud into one or more separator (not shown) which may separate the mud from the cuttings. From the separator, the mud may be returned to mud pit (78) for storage and re-use.

Various sensors may be placed on the drilling rig (12) to take measurements of the drilling equipment. In particular, a hookload may be measured by hookload sensor (94) mounted on deadline (77), block position and the related block velocity may be measured by a block sensor (95) which may be part of the draw works (70). Surface torque may be measured by a sensor on the rotary table (88). Standpipe pressure may be measured by pressure sensor (92), located on standpipe (86). Signals from these measurements may be communicated to a surface processor (96) or other network elements (not shown) disposed around the drilling rig (12). In addition, mud pulses traveling up the drillstring may be detected by pressure sensor (92). For example, pressure sensor (92) may include a transducer that converts the mud pressure into electronic signals. The pressure sensor (92) may be connected to surface processor (96) that converts the signal from the pressure signal into digital form, stores and demodulates the digital signal into useable MWD data. According to various embodiments described above, surface processor (96) may be programmed to automatically detect one or more rig states based on the various input channels described. Processor (96) may be programmed, for example, to carry out an automated event detection as described above. Processor (96) may transmit a particular rig state and/or event detection information to user interface system (97) which may be designed to warn various drilling personnel of events occurring on the rig and/or suggest activity to the drilling personnel to avoid specific events. As described below, one or more of these equipments may be operated by a drilling management network coupled to the drilling rig (12). For example, the drilling management network (200) described below in FIGS. 2A and 2B may automate one or more drilling processes associated with these equipments without manual human intervention.

Turning to FIG. 2A, FIG. 2A shows a block diagram of a system in accordance with one or more embodiments. As shown in FIG. 2A, a drilling management network (200) may include various user devices (e.g., user device (290)), various network elements (e.g., network elements (205)), and various host devices (e.g., host device A (211), host device N (212), host devices (213)). The user devices may include hardware and/or software coupled to the drilling management network (200), and which includes functionality for presenting data and/or receiving inputs from a user regarding various drilling operations and/or maintenance operations performed within the drilling management network (200). For example, a user device may include personal computers, smartphones, human machine interfaces, and any other devices coupled to a network that obtain inputs from one or more users, e.g., by providing a graphical user interface (GUI). Likewise, a user device may present data and/or receive control commands from a user for operating a drilling rig. A network element may refer to various software and/or hardware components within a network, such as switches, routers, hubs, user equipment, or any other logical entities for uniting one or more physical devices on the network.

In one or more embodiments, the drilling management network (200) may further include various host devices. In particular, a host device may include hardware and/or software that is coupled to drilling equipment (e.g., drilling equipment A (286), drilling equipment N (287)) and one or more programmable logic controllers (PLCs) (e.g., PLCs A (281), PLCs N (282)). The drilling equipment may include the blowout preventer (99), the drilling rig (12), and other components described above in FIG. 1 and the accompanying description. PLCs coupled to host devices may form various control systems, such as various drilling operation control systems and various maintenance control systems. In particular, PLCs may include hardware and/or software with functionality to control one or more processes performed by a drilling rig, including, but not limited to the components described in FIG. 1. Specifically, a PLC may control valve states, fluid levels, pipe pressures, warning alarms, and/or pressure releases throughout a drilling rig. Moreover, a programmable logic controller may be a ruggedized computer system with functionality to withstand vibrations, extreme temperatures, wet conditions, and/or dusty conditions, for example, around a drilling rig.

In one or more embodiments, a host device includes a virtualization controller (e.g., virtualization controller A (231), virtualization controller N (232)) operating on a host operating system (e.g., host operation system A (221), host operating system N (222)). A virtualization controller may include hardware and/or software that includes functionality for communicating with other virtualization controllers on a drilling management network and/or implementing various virtualization services on the drilling management network. For example, virtualization controllers may be virtual machines or software containers operating on the host devices (211, 212). Virtualization services may include network processes that are operated on multiple network devices (e.g., host devices (211, 212), network elements (205), host devices (213)). Examples of virtualization services may include oilfield data management among PLCs and/or drilling equipment, virtual machine management, software container management, memory resource allocation among host devices on a drilling management network, various network processes for administering the drilling management network, etc.

A software container may be a user-space instance implemented by a single kernel of a host operating system (e.g., host operating system A (221), host operating system N (222)). In particular, a software container may be an abstraction at an application layer that allows isolated processes to operate inside the software container. Likewise, multiples software containers may operate on a single kernel of an operating system. Software containers may include docker containers, Java™ containers, Windows Server containers, etc. In contrast, a virtual machine may include hardware and/or software that may provide an abstraction of physical hardware. For example, a virtual machine may have an independent operating system that is separate from a host operating system where a virtual machine may operate on one or more host devices with dedicated memory and other computer resources.

Figure 2B:
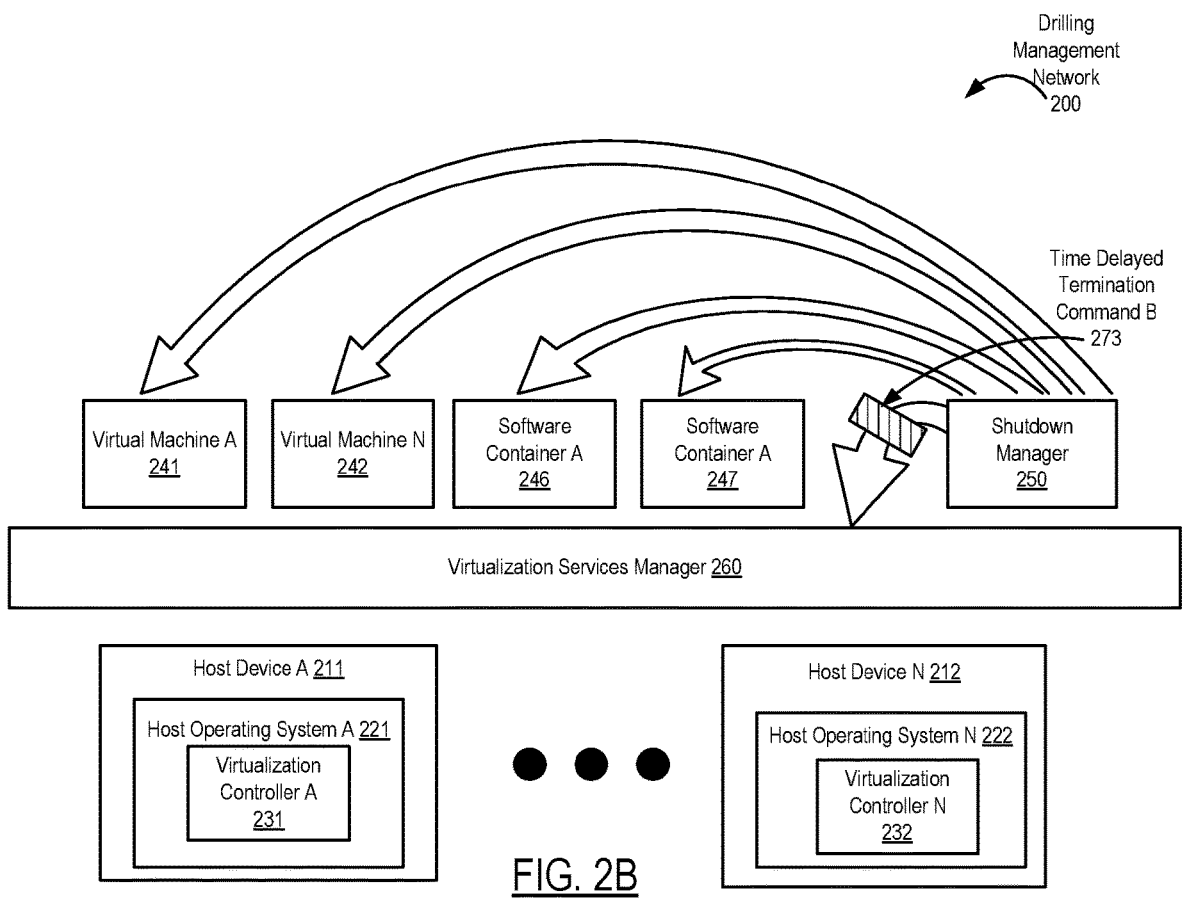

Turning to FIG. 2B, a virtualization services manager (e.g., virtualization services manager (260)) may include hardware and/or software that includes functionality for generating, terminating, monitoring, and/or managing one or more virtual machines (e.g., virtual machine A (241), virtual machine N (242)) and/or software containers (e.g., software container A (246), software container N (247)) operating on a virtualization services layer of a drilling management network. In some embodiments, a virtualization services manager includes a hypervisor for managing one or more virtualized environments on a drilling management network. For example, virtualization services may be implemented in one or more network layers on the drilling management network, e.g., where virtual machines and/or software containers operate on the network layers. Rather than implementing a virtual machine or software container on a single host device, for example, virtualization services may be implemented using a virtual machine or software container that operates on multiple host devices.

Furthermore, in one or more embodiments, the virtualization services manager (260) is an elected virtualization controller that is designated by the other virtualization controllers to initiate virtualization services, virtual machines and/or software containers operating on a virtualization services layer. For more information on an elected virtualization services manager, see FIG. 2C below and the accompanying description.

Moreover, a virtualization services manager (e.g., virtualization services manager (260)) may administer and/or monitor various host device resources for virtual machines and/or software containers operating on a virtualization services layer. Likewise, the virtualization general architecture of the drilling management network (200) may be the same where a host operating system is running on bare metal (e.g., a hardware computing system), or as a virtual machine. For example, virtual machines and software containers may communicate with each other in the virtualization services layer and run virtualization services in an orchestrated manner.

Keeping with FIG. 2B, in some embodiments, a drilling management network includes a shutdown manager (e.g., shutdown manager (250)) (also called "infrastructure manager") that includes functionality for initiating terminating operations at one or more host devices, one or more host devices, one or more virtual machines, one or more software containers, one or more virtualization controllers, and/or a virtualization services manager. In one or more embodiments, the virtualization services manager and the shutdown manager are the same software application or network device. For example, a shutdown manager may include functionality for monitoring environmental variables and other network variables for different systems on a drilling management network. As such, in response to various triggers associated with the environmental variables and network variables, the shutdown manager may initiate a coordinated process based on established rules to perform a complete shutdown of the control system or subsystems in the drilling management network.

Furthermore, a shutdown manager may receive a request from a user device (e.g., user device (290)) to terminate operations of all or a portion of a drilling management network. Accordingly, the shutdown manager may initiate the termination of operations for host devices, virtual machines, software containers, virtualization services managers, and/or virtualization controllers. In some embodiments, the shutdown manager initiates termination operations automatically in response to detecting one or more shutdown conditions corresponding to predetermined states in a drilling management network, e.g., drilling rig equipment malfunctions causing a cease of operations on a drilling management network. Likewise, a shutdown manager may automatically initiate termination operations at a predetermined time, e.g., a user may designate a predetermined day and/or time for shutting down a drilling management network.

In some embodiments, for example, a shutdown manager includes functionality for transmitting a time delayed termination command (e.g., time delayed termination command A (271), time delayed termination command N (272), time delayed termination command B (273)) to one or more host devices, one or more virtualization controllers, etc. A time delayed termination command may include instructions designating a predetermined termination time when respective hardware and/or software (e.g., host device A (211), virtual machine A (241), software container A (246), virtualization controller A (231), virtualization services manager (260), etc.) terminates operations. The termination time may be a specific time of day, e.g., at 8:00 PM Central Standard Time, or at a relative time, e.g., 10 minutes after receiving a respective time delayed termination command from a shutdown manager.

At the predetermined termination time, for example, a software application or network device may terminate various software and/or hardware processes operating within a network device. Likewise, the termination time may correspond to various processes associated with terminating operations, such as deallocation of computer resources e.g., system memory and processing power, and/or storing data from the software processes and/or hardware processes into a data storage unit for later retrieval. Terminating operations may further correspond to ending a supply of electrical power to a respective network device, such as a virtual machine, software container, and/or host device.

Figure 2C:
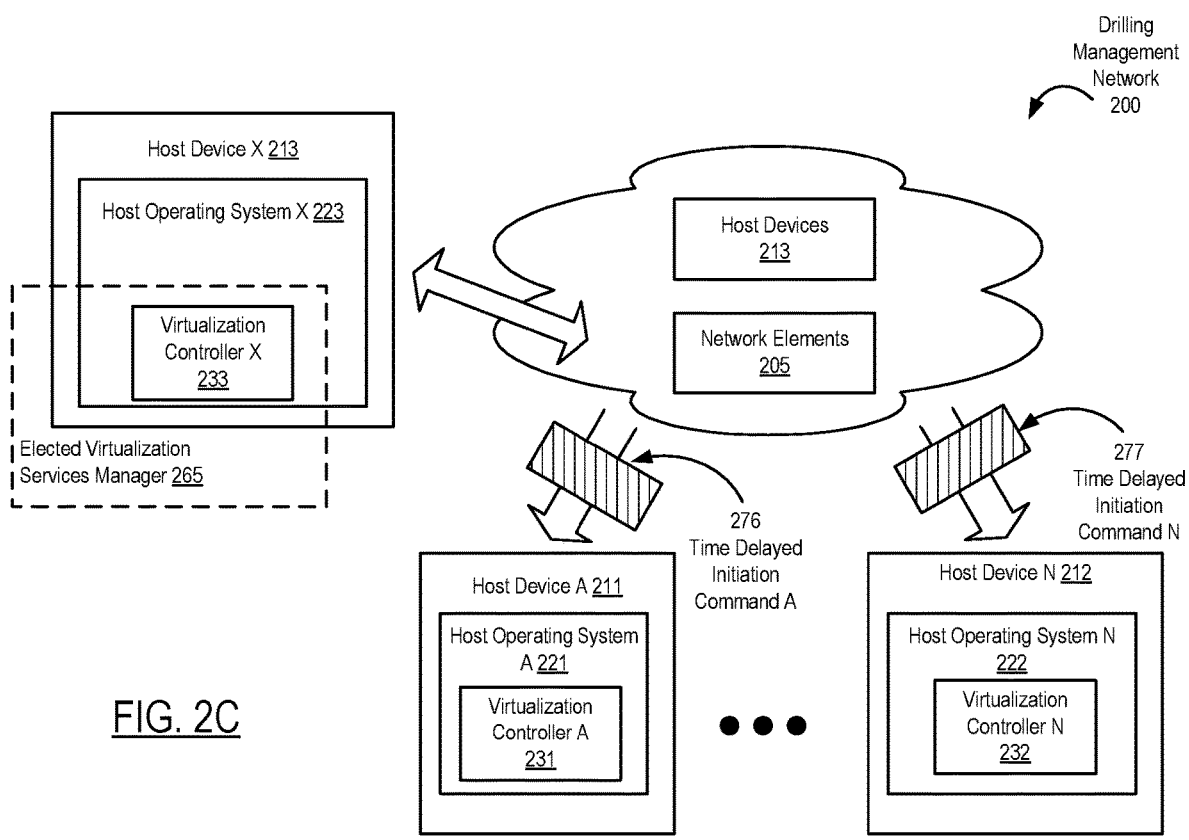

Turning to FIG. 2C, FIG. 2C shows a block diagram of a system in accordance with one or more embodiments. As shown in FIG. 2C, the drilling management network (200) may include functionality for initiating one or more processes for restarting services in the drilling management network (200). In one or more embodiments, for example, various virtualization controllers (e.g., virtualization controller A (231), virtualization controller N (232), virtualization controller X (233)) include functionality for determining which virtualization controller may act as an elected virtualization services manager for the drilling management network (233). In particular, an elected virtualization services manager may be a temporary virtualization services manager until a virtualization services layer is established throughout a drilling management network. As shown in FIG. 2C, for example, the virtualization controllers (231, 232, 233) elect virtualization controller X (233) as the elected virtualization services manager (265). Similar to the other virtualization controllers, virtualization controller X (233) operates as a virtualized environment on a host operating system X (223) located in the host device X (213). As the elected virtualization services manager (265), virtualization controller X (233) may act as a leader in coordinating various processes among the other virtualization controllers (231, 232) on the drilling management network (200). In particular, the elected virtualization services manager (265) may include functionality similar to the virtualization services manager (260) in FIG. 2A.

In some embodiments, an elected virtualization services manager includes functionality to transmit one or more time delayed initiation commands (e.g., time delayed initiation command A (276), time delayed initiation command N (277)). For example, the elected virtualization services manager (265) may include functionality for determining one or more predetermines times in a startup sequence for virtual machines, software containers, and/or other virtualization services operating in the drilling management network (200). As such, the time delayed initiation commands may enable various virtualization services provided by a virtualization services manager to be implemented before various virtual machines and/or software containers are implemented on the drilling management network (200).

While FIGS. 1, 2A, 2B, and 2C show various configurations of components, other configurations may be used without departing from the scope of the disclosure. For example, various components in FIGS. 1, 2A, 2B, and 2C may be combined to create a single component. As another example, the functionality performed by a single component may be performed by two or more components.

Figure 3:
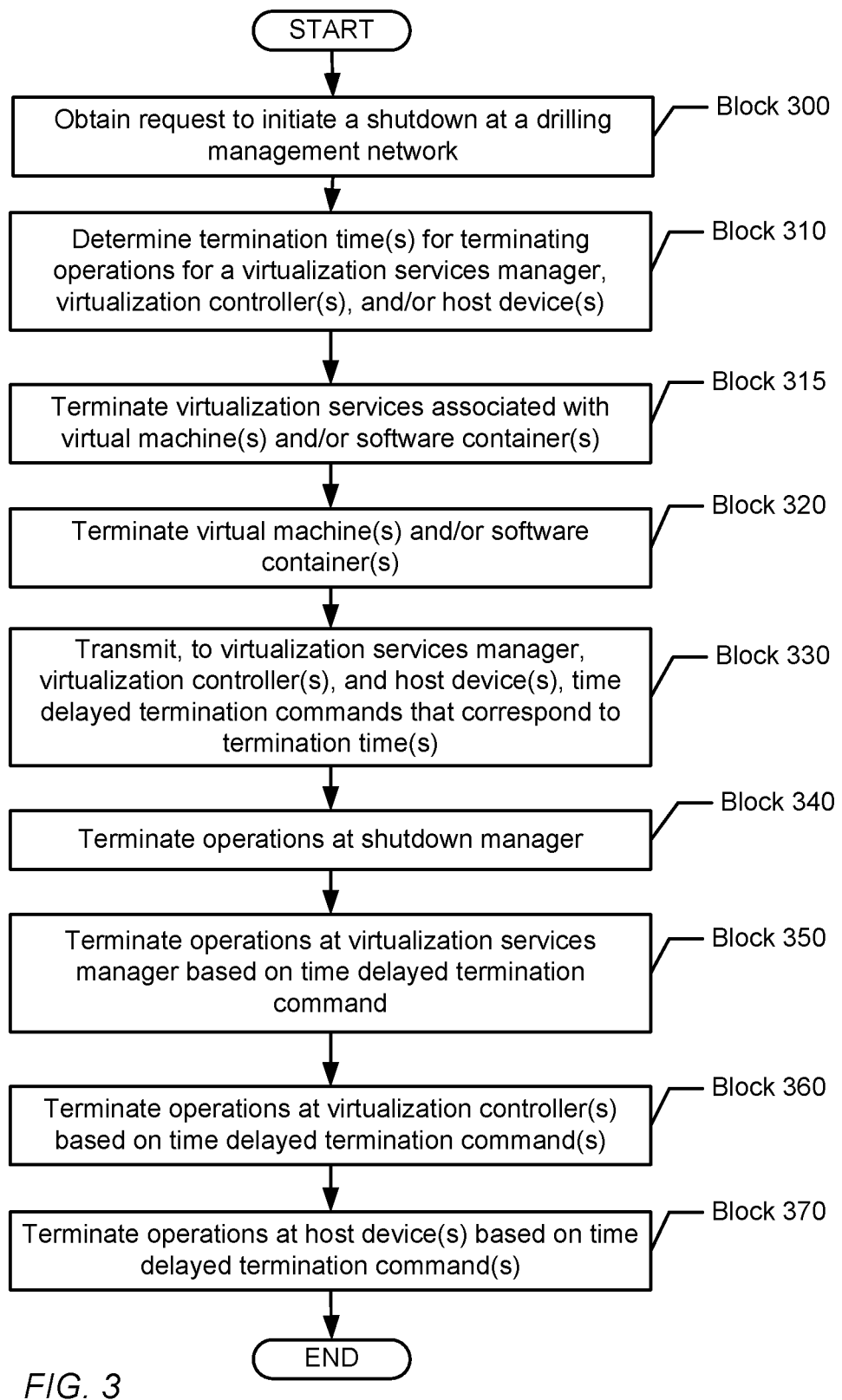
FIGS. 3 and 4 show flowcharts in accordance with one or more embodiments.

Turning to FIG. 3, FIG. 3 shows a flowchart in accordance with one or more embodiments. Specifically, FIG. 3 describes a method for shutting down a network. One or more blocks in FIG. 3 may be performed by one or more components (e.g., shutdown manager (250)) as described in FIGS. 1, 2A, 2B, and/or 2C. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a request to initiate a shutdown at a drilling management network is obtained in accordance with one or more embodiments. For example, a user may provide a user input at a user device on a drilling management network to perform a graceful shutdown. In response to the user input, the user device may transmit a request to a shutdown manager to initiate a process to terminate operations throughout the drilling management network. The request may be a message that identifies a date and/or time as well as which control systems and other network devices are designated for ending operations. In some embodiments, the shutdown manager is similar to shutdown manager (250) described above in FIG. 2A and the accompanying description.

In some embodiments, a shutdown manager automatically initiates a shutdown if various shutdown conditions, such as environmental conditions (e.g., temperature, humidity, condensation, etc.), network conditions, and/or drilling operation conditions exceed predetermined operational limits of one or more virtualized systems (e.g., a virtualization services manager, various virtualization controllers, etc.). For example, a shutdown manager and/or a virtualization services manager may monitor a drilling management network for the shutdown conditions. If a particular shutdown condition is detected, the shutdown manager may automatically initiate a shutdown sequence of the drilling management network Thus, the shutdown manager may trigger a graceful shutdown of a network without human intervention. In some embodiments, a shutdown manager may trigger a shutdown in case of a power outage. Thus, the shutdown manager may perform a shutdown of the network before any systems run out of backup power. In some embodiments, for example, once the shutdown manager detects that drilling operations are completed, the shutdown manager initiates a shutdown.

In Block 310, one or more termination times are determined for a virtualization services manager, one or more virtualization controllers, and/or one or more host devices in accordance with one or more embodiments. A shutdown manager may determine when different software programs and network devices within a drilling management network terminate operations. Moreover, the termination times may correspond to a shutdown sequence describing an order that a shutdown manager, a virtualization services manager, the one or more virtualization controllers, and the one or more host devices terminate operations within the drilling management network. In some embodiments, for example, the shutdown sequence designates the shutdown manager as the first software program or network device to terminate operations. After the shutdown manager ends, the shutdown sequence may designate the virtualization services manager next. After the virtualization services manager ends, the shutdown sequence may designate individual virtualization controllers to terminate operations next. After the virtualization controllers end, the host device may be scheduled to terminate operations. In other embodiments, other shutdown sequences may be used, e.g., where one host device terminates operations before the virtualization services manager or shutdown manager in the shutdown sequence.

In some embodiments, the termination times are based on how much power remains to various hardware devices in a network. For example, in response to a power outage at a network, one or more host device power supplies may communicate to a shutdown manager how many minutes of operation time remaining for the host devices. The shutdown manager may then calculate an allotted amount of time for performing a shutdown process for each virtual machine, software container, virtualization services manager, virtualization controllers, etc. before any device loses power.

In Block 315, various virtualization services associated with one or more virtual machines and/or one or more software containers are terminated in accordance with one or more embodiments. For example, a virtualization services manager and/or a shutdown manager may communicate with the virtual machines and software containers to stop virtualization services that are being performed by the virtual machines and software containers. The virtualization services may include critical processes where data loss may result from a hard or forceful shutdown of the critical processes.

In Block 320, one or more virtual machines and/or one or more software containers are terminated in accordance with one or more embodiments. After terminating the virtualization services at the virtual machines and/or software containers, for example, the virtualization services manager and/or the shutdown manager may start a communication with the virtual machines and/or software containers to have the virtual machines and/or software containers terminate as part of a shutdown sequence.

If a virtual machine and/or a software container cannot terminate operations gracefully, e.g., an underlying process for performing a graceful shutdown crashes, the shutdown manager or the virtualization services manager may apply a forceful shutdown to the virtual machine or software container. In particular, the difference between a forceful shutdown and a graceful shutdown may include whether data is successfully saved or lost/corrupted during the termination process.

In Block 330, various time delayed termination commands corresponding to one or more termination times are transmitted to a virtualization services manager, one or more virtualization controllers, and one or more host devices in accordance with one or more embodiments. In some embodiments, for example, a time delayed termination command for a host device has a delay time of T+X+Y, where T is when the shutdown manager terminates operations, X is where the virtualization services manager terminates operations, and Y is the designated time when the virtualization controllers have terminated operations. The time delayed termination command of a virtualization controller may have a delay time of T+X. Likewise, a time delayed termination command of a virtualization services manager may be T. Thus, the time delayed termination commands may be similar to the time delayed termination commands described in FIG. 2A and the accompanying description.

In particular, a shutdown manager may administer a shutdown sequence using the time delayed termination commands, as shown in the example in FIG. 5 below. By administering the shutdown process, the drilling management network may complete a graceful shutdown, which may allow the network to resume operations later with minimum risk of data and system corruption.

Figure 5:
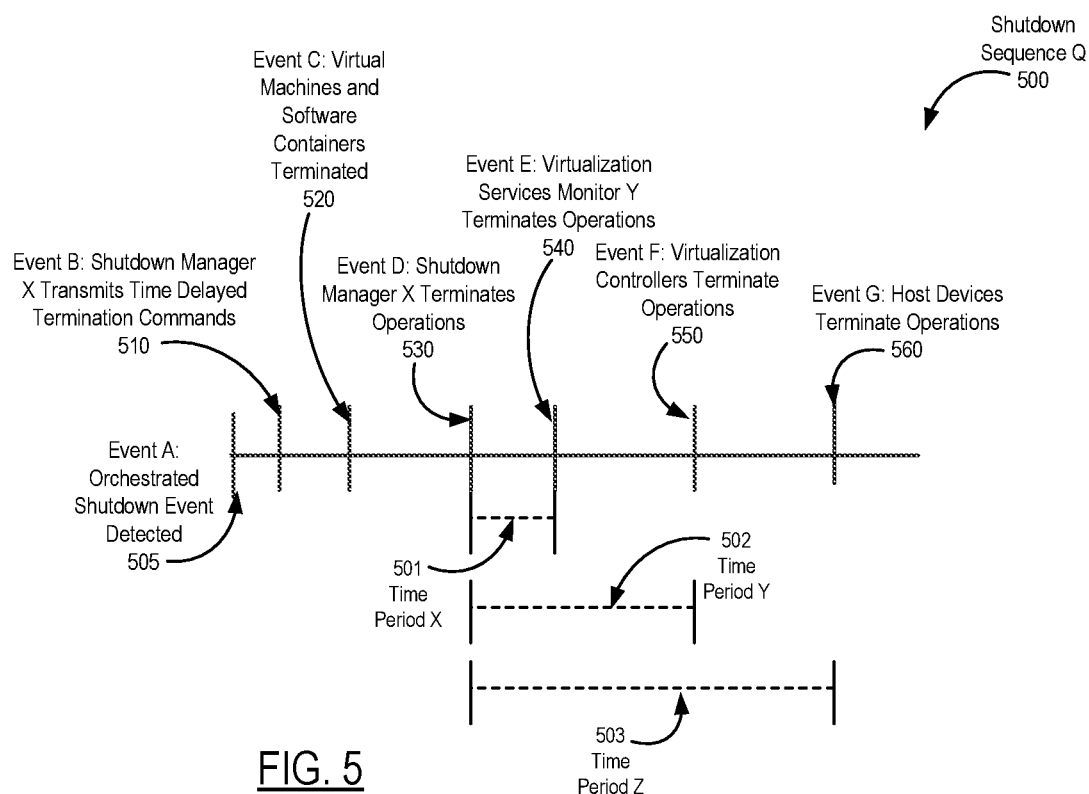
FIG. 5 shows an example in accordance with one or more embodiments.

Turning to FIG. 5, FIG. 5 provides an example of a shutdown sequence Q (500). The following example is for explanatory purposes only and not intended to limit the scope of the disclosure. Turning to FIG. 5, the shutdown sequence Q (500) includes a sequential series of time events (e.g., event A (505), event B (510), event C (520), event D (530), event E (540), event F (550), and event G (560). At event A (505), a shutdown manager X detects an orchestrated shutdown event, e.g., a power outage at a drilling rig, a predetermined environmental condition with respect to a location or device at the drilling rig, etc. At event B (510), shutdown manager X transmits time delayed termination commands to a virtualization services manager Y, various virtualization controllers, and host devices. At event C (520), various virtual machines and software containers operating on a drilling rig network are terminated. At event D (530), the shutdown manager X terminates operations. At event E (540), a virtualization services manager Y terminates operations based on the time in a respective time delayed termination command. As shown in FIG. 5, the virtualization services manager Y was designated by the shutdown manager to stop operating at time period X (501). At event F (550), the virtualization controllers stop operating according to the time in their respective time delayed termination commands, i.e., at time period Y (502). At event G (560), the host devices stop operating according to the time in their respective time delayed termination commands, i.e., at time period Z (503). With respect to event E (540), event F (550), and event G (560), these may be well-timed events where the time periods (501, 502, 503) allow some time for these components to shutdown gracefully. However, where the components become irresponsive such that a service cannot be terminated, the shutdown sequence Q (500) may proceed to the next event and kill the irresponsive service accordingly. Thus, the time delayed commands provided for a staggered orchestrated shutdown process after the shutdown manager has already ended operations. As such, the termination of operations in event C (520), event D (530), event E (540), event F (550), and event G (560) may include graceful shutdowns and/or forceful shutdowns.

While the shutdown sequence Q (500) in FIG. 5 illustrates one sequence of events for an orchestrated shutdown, other sequence of events are contemplated that include adding and/or removing events from a shutdown sequence. Likewise, operations of various components may be terminated in a different order from the shutdown sequence Q (500).

Returning to FIG. 3, in Block 340, operations are terminated at a shutdown manager in accordance with one or more embodiments. Once the time delayed termination commands are transmitted to various network devices, the shutdown manager may ends any processes associated with it. For example, the shutdown manager may be a virtual machine or software container which can be terminated by a virtualization services manager. If the shutdown manager is a hardware device, the shutdown manager may experience a hard shutdown that eliminates power to the shutdown manager. The shutdown manager may be similar to the shutdown manager described above in FIG. 2A and the accompanying description.

In Block 350, operations are terminated at a virtualization services manager based on a time delayed termination command in accordance with one or more embodiments. At a termination time associated with a time delayed termination command, the virtualization services manager may terminate any virtualization services operating over a drilling management network and itself. The virtualization services manager may be similar to the virtualization services manager described above in FIGS. 2A, 2B, and/or 2C and the accompanying description.

In Block 360, operations are terminated at one or more virtualization controllers based on one or more time delayed termination commands in accordance with one or more embodiments. The virtualization controllers may be similar to the virtualization controllers described above in FIGS. 2A, 2B, and/or 2C and the accompanying description.

In Block 370, operations are terminated at one or more host devices based on one or more time delayed termination commands in accordance with one or more embodiments. The host devices may be similar to the host devices described above in FIGS. 2A, 2B, and/or 2C and the accompanying description.

While terminating operations in blocks 320, 340, 350, 360, and 370 may correspond to graceful shutdowns, one or more forceful shutdowns may be employed to terminate operations. For example, a time delayed termination command may trigger a forceful shutdown of a virtualization controller by a host operating system terminating resources associated with the virtualization controller. Likewise, a time delayed termination command may also produce instructions for an electric power supply that ends electric power any hardware associated with a host device, virtual machine and/or software container.

Figure 4:
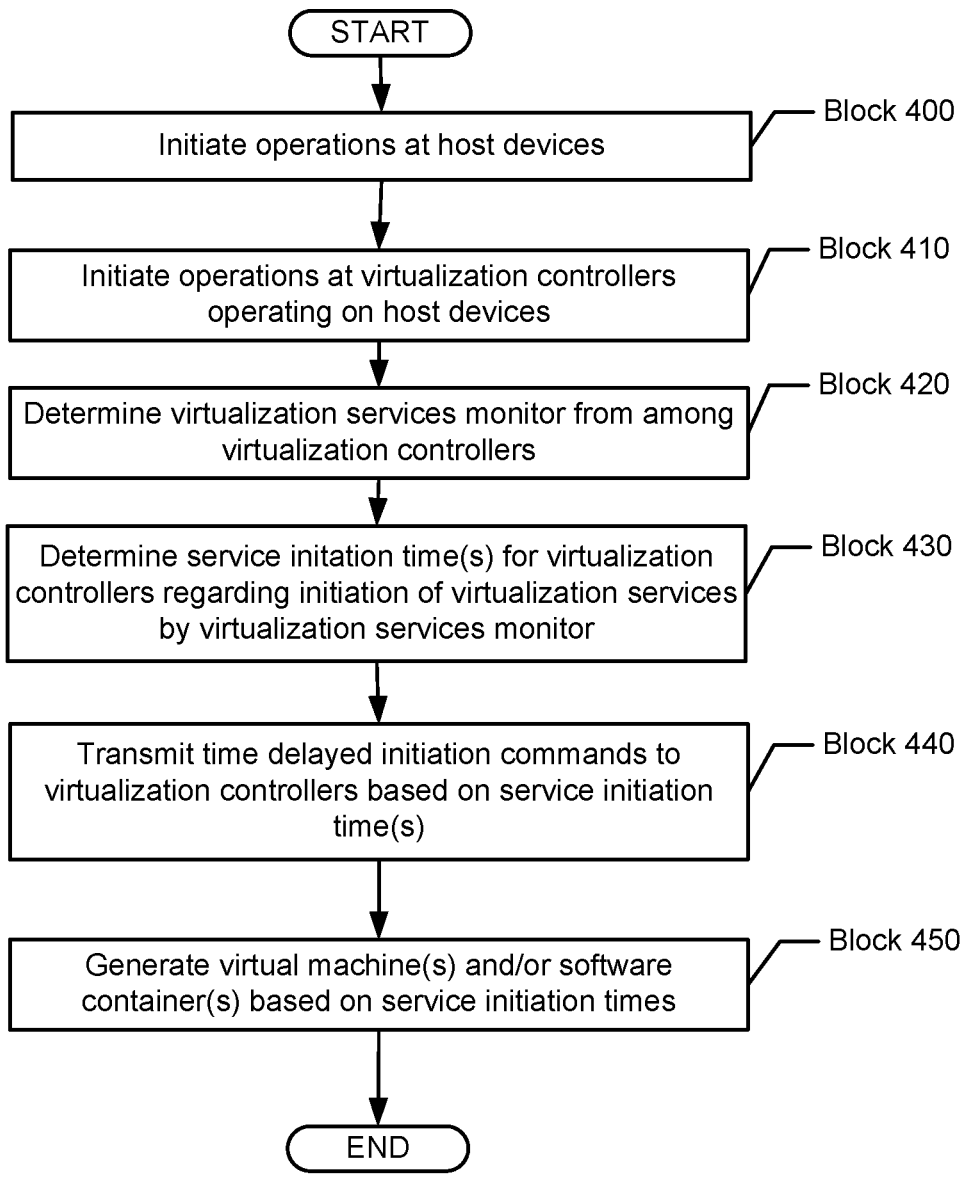

Turning to FIG. 4, FIG. 4 shows a flowchart in accordance with one or more embodiments. Specifically, FIG. 4 describes a method for starting up a network. One or more blocks in FIG. 4 may be performed by one or more components (e.g., virtualization controller X (233)) as described in FIGS. 1, 2A, 2B, and/or 2C. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, operations are initiated at various host devices in accordance with one or more embodiments. For example, host devices may receive electric power and host operating systems on the host devices may startup.

In Block 410, operations are initiated at various virtualization controllers operating on various host devices in accordance with one or more embodiments. For example, as part of the host operating system or as a separate software script, the virtualization controllers may begin operating on the host devices. Accordingly, a virtualization controller may transmit and receive information over a drilling management network with other virtualization controllers.

In Block 420, a virtualization services manager is determined from among various virtualization controllers in accordance with one or more embodiments. Based on communication among the virtualization controllers, one virtualization controller may be selected to be a virtualization services manager. The selection process may be based on the types of control systems being operated on host devices through a drilling management network. For example, a virtualization controller on a host device with the lowest amount of overhead may be elected as the virtualization services manager. The elected virtualization services manager may be similar to the elected virtualization services manager described above in FIG. 2C and the accompanying description.

In Block 430, one or more service initiation times are determined for various virtualization controllers in accordance with one or more embodiments. For example, a virtualization services manager may determine a startup sequence for various virtualization services operating on a drilling management network, such as the order to generate virtual machines and/or software containers for operating various control systems. Accordingly, the initiation times may be similar to the termination times described in FIG. 3, such that various startup operations are staggered. Accordingly, the service initiation times may provide the virtualization services manager to verify that specific virtual machines and/or software containers are operating satisfactorily before the next batch of virtual machines and/or software containers are generated.

In Block 440, various time delayed initiation commands are transmitted to various virtualization controllers based on various service initiation times in accordance with one or more embodiments. The time delayed initiation commands may be similar to the time delayed initiation commands described above in FIG. 2C and the accompanying description.

In Block 450, various virtual machines and/or software containers are generated based on various service initiation times in accordance with one or more embodiments.

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B >0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A network, comprising:
  a plurality of network elements;
  a plurality of host devices coupled to the plurality of network elements;
  a first virtualization services manager coupled to the plurality of network elements and configured to operate on the plurality of host devices, wherein the first virtualization services manager is configured to generate a virtual machine or software container that implements at least one virtualization service on a network layer, and wherein the at least one virtualization service is configured to control at least one drilling operation; and
  a shutdown manager coupled to the plurality of network elements, the plurality of host devices, and the first virtualization services manager,
  wherein the shutdown manager is configured to transmit a plurality of time delayed termination commands to the plurality of host devices and the first virtualization services manager, and
  wherein, after the shutdown manager terminates operation, the first virtualization services manager and the plurality of host devices are configured to terminate operations according to the plurality of time delayed termination commands.

2. The network of claim 1,
  wherein the shutdown manager is further configured to initiate automatically a shutdown sequence in response to detecting a shutdown condition among the plurality of network elements or the plurality of host devices, and
  wherein the plurality of time delayed termination commands correspond to the shutdown sequence.

3. The network of claim 1, further comprising:
  a virtualization controller operating on a host device among the plurality of host devices and coupled to the first virtualization services manager,
  wherein the shutdown manager is configured to transmit a time delayed termination command to the virtualization controller,
  wherein, according to the time delayed termination command, the virtualization controller is configured to terminate operations after the virtualization services manager terminates operations and before the host device terminates operations.

4. The network of claim 1, further comprising:
  a plurality of virtualization controllers operating on the plurality of host devices,
  wherein at least one virtualization controller of the plurality of virtualization controllers is configured to initiate operations on a respective host device among the plurality of host devices in response to the respective host device initiating operations, and
  wherein the plurality of virtualization controllers are configured to establish a second virtualization services manager after initiating operations.

5. The network of claim 4,
  wherein the plurality of virtualization controllers are virtual machines operating on the plurality of host devices.

6. The network of claim 1, further comprising:
  a virtualization controller configured to communicate with the virtualization services manager,
  wherein the virtualization services manager is a first virtual machine,
  wherein the shutdown manager is a second virtual machine, and
  wherein the virtualization controller is a third virtual machine operating on an operating system in the host device.

7. The network of claim 1,
  wherein the shutdown manager is configured to terminate operations for the virtual machine or software container before transmitting the plurality of time delayed termination commands.

8. The network of claim 1,
  wherein the plurality of host devices comprises a control system that comprises one or more programmable logic controllers (PLCs) configured for managing one or more processes performed by a drilling rig.

9. The network of claim 1,
wherein the first virtualization services manager comprises a hypervisor.

10. A method, comprising:
determining a first termination time for a virtualization services manager and a plurality of termination times for a plurality of host devices operating in a drilling management network, wherein the virtualization services manager is configured to generate a virtual machine or a software container that implements at least one virtualization service on a network layer that controls at least one drilling operation;
transmitting, by a shutdown manager, a first time delayed termination command to the virtualization services manager and a plurality of time delayed termination commands to the plurality of host devices, wherein the first time delayed termination command corresponds to the first termination time and the plurality of time delayed termination commands correspond to the plurality of termination times;
terminating operations at the virtualization services manager based on the first termination time and in response to the shutdown manager terminating operations; and
terminating operations at the plurality of host devices based on the plurality of termination times and in response to the virtualization services manager terminating operations.

11. The method of claim 10, further comprising:
detecting, by the shutdown manager, a shutdown condition for the drilling management network,
wherein the shutdown manager automatically initiates a shutdown sequence in response to detecting the shutdown condition, and
wherein the first time delayed termination command and the plurality of time delayed termination commands correspond to the shutdown sequence.

12. The method of claim 10,
wherein the virtualization services manager comprises a hypervisor.

13. The method of claim 10, further comprising
transmitting, by the shutdown manager, a second time delayed termination command to a virtualization controller operating on a host device;
terminating operations at the virtualization controller based on a second termination time corresponding to the second time delayed termination command; and
terminating operations at the host device in response to terminating operations at the virtualization controller.

14. The method of claim 10, further comprising:
obtaining, from a user device, a request to initiate a shutdown of the drilling management network,
wherein the request is in response to a manual input from a user, and
wherein the first time delayed termination command and the plurality of time delayed termination commands are transmitted in response to obtaining the request.

15. The method of claim 10, further comprising:
detecting, by a shutdown manager, a power outage at the drilling management network,
wherein the first time delayed termination command and the plurality of time delayed termination commands are transmitted automatically in response to the shutdown manager detecting the power outage.

16. The method of claim 10,
wherein the first termination time and the plurality of termination times correspond to a shutdown sequence for the drilling management network, and
wherein the shutdown sequence designates a plurality of virtualization controllers terminating operations after the virtualization services manager and before the plurality of host devices terminate operations.

17. A method, comprising:
initiating operations at a plurality of virtualization controllers operating on a plurality of host devices automatically in response to the plurality of host devices initiating operations on a drilling management network;
determining, by a virtualization services manager, a plurality of service initiation times for the plurality of virtualization controllers, wherein the plurality of service initiation times correspond to a plurality of predetermined times after initiation of virtualization services on the drilling management network by the virtualization services manager;
transmitting, by the virtualization services manager, a plurality of time delayed initiation commands to the plurality of virtualization controllers, wherein the plurality of time delayed initiation commands correspond to the plurality of service initiation times; and
generating one or more virtual machines or one or more software containers that control at least one drilling operation performed by the plurality of host devices.

18. The method of claim 17, further comprising:
determining, by the plurality of virtualization controllers, the virtualization services manager from among the plurality of virtualization controllers.

19. The method of claim 17,
wherein the plurality of virtualization controllers are initiated automatically in response to a host operating system bootup process that is operated on the plurality of host devices.

20. The method of claim 17,
wherein the plurality of host devices correspond to one or more control systems that comprises one or more programmable logic controllers (PLCs) configured for managing one or more processes performed by a drilling rig.

* * * * *